United States Patent

Swadner et al.

[11] 3,910,164
[45] Oct. 7, 1975

[54] SPLIT CYLINDER RADIAL-FOUR AUTOMOTIVE AIR CONDITIONING COMPRESSOR

[75] Inventors: Robert L. Swadner; Marvin E. Gaines, both of Dayton, Ohio

[73] Assignee: General Motors Corporation, Detroit, Mich.

[22] Filed: Mar. 28, 1974

[21] Appl. No.: 455,674

[52] U.S. Cl. .................... 92/128; 92/249; 417/273
[51] Int. Cl.² .................... F01B 29/00; F04B 27/04
[58] Field of Search ...... 417/273; 92/155, 248, 249, 92/128

[56] References Cited
UNITED STATES PATENTS

| | | | |
|---|---|---|---|
| 3,146,683 | 9/1964 | Hoffmann | 92/155 |
| 3,174,436 | 3/1965 | Wanner | 417/273 |
| 3,212,411 | 10/1965 | Storms | 92/248 |
| 3,703,125 | 11/1972 | Pauliukonis | 92/249 |

Primary Examiner—William L. Freeh
Assistant Examiner—G. P. La Pointe
Attorney, Agent, or Firm—Edward P. Barthel

[57] ABSTRACT

A compact high capacity radial refrigerant compressor suitable for use in automobile refrigeration systems includes a two-part cast cylindrical housing formed by a pair of front and rear shell-like split half sections with each section having oppositely extending semi-cylindrical cross recesses such that upon the section being closed along a common plane defined by the section's parting surfaces the recesses form oppositely extending piston cross bores located in the plane. Cross operating yokes which are actuated by a common slider block through a shaft eccentric have integral opposed pistons forming oppositely extending piston assemblies such that upon insertion in the cross recesses of one half section serve as assembly locators for aligning the other half section thereon. An annular groove on each piston skirt receives a relatively wide annular Teflon flexible seal to provide a relatively long bearing length of the seal which compensates for any small tolerance mismatch between the piston bore forming registering cross recesses.

3 Claims, 3 Drawing Figures

U.S. Patent    Oct. 7,1975    3,910,164

SPLIT CYLINDER RADIAL-FOUR AUTOMOTIVE AIR CONDITIONING COMPRESSOR

This invention relates to radial compressors and a method of assembly thereof, and particularly to a compact automotive refrigerant compressor of the type including a two-part cast cylindrical housing formed by a pair of front and rear shell-like half sections split along a common plane which is diametrical to oppositely extending cross bores designed for the reception of pairs of double-acting piston assemblies reciprocating therein.

It is an object of the present invention to provide a radial refrigerant compressor used in association with a vehicle air conditioning system wherein a cast cylindrical housing is formed by a pair of front and rear severed shell-like half sections with each section having oppositely extending semi-cylindrical cross recesses located on first and second normally positioned axes, which when closed by joining the section halves along their common severance plane by the section's parting surfaces define oppositely extending piston cross bores, and wide resilient bearing seals on the relatively short piston skirts of the double-ended pistons compensate for any small tolerance mismatch between the piston bore forming registering cross recesses.

Another object of this invention is the provision of an improved method of assembling a radial compressor wherein a pair of cross operating piston assemblies each with yokes having opposed integral pistons forming an assemblage with a shaft assembly which when placed within the cross recesses of one half section of a split cylinder housing serve as locators for aligning the other half section thereon.

A more complete understanding of the present invention may be had from the following detailed description which should be taken in conjunction with the drawings in which.

Figure 1:
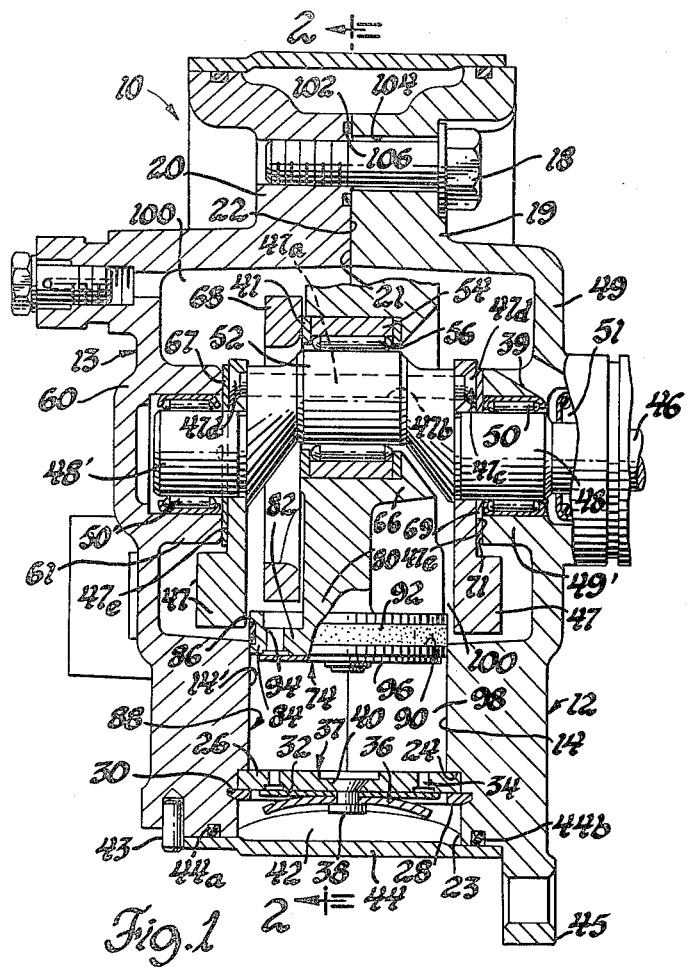
FIG. 1 is a view in vertical section taken on an irregular plane through a radial compressor incorporating features of the present invention.
Figure 3:
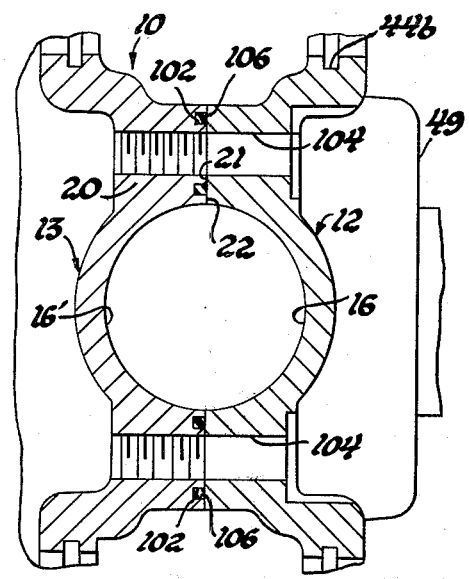
FIG. 3 is a fragmentary sectional view taken on line 3—3 of FIG. 2.
Figure 2:
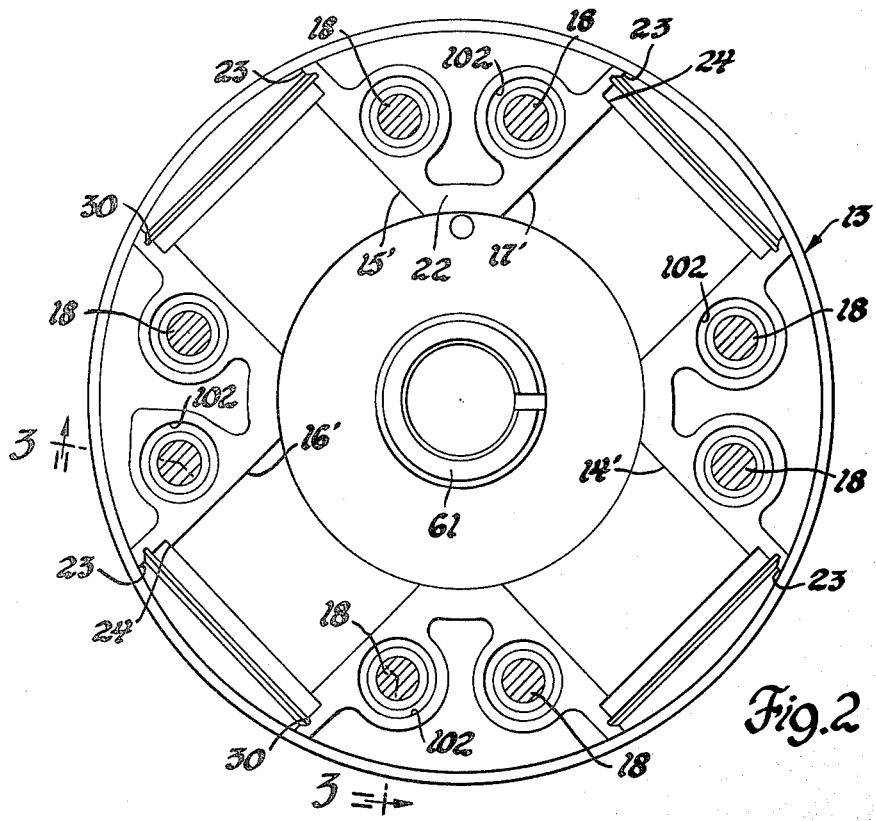
FIG. 2 is a vertical cross-sectional view taken on line 2—2 of FIG. 1, with the piston and shaft assemblies removed.

Referring now to the drawings, a radial compressor is shown in FIGS. 1, 2 and 3. The subject invention is a modification of the compressor assembly described in the instant inventors' copending application Ser. No. 416,933, filed Nov. 19, 1973, and assigned to the assignee of this invention.

The subject compressor includes a two-part cylindrical housing 10 formed by a pair of rigid cast front and rear shell-like half sections 12 and 13 with each section having radially located semi-cylindrical cross recesses. As shown by FIG. 2 the rear half section 13 has oppositely extending semi-cylindrical cross recesses 14' and 15' on a first axis and a second pair of semi-cylindrical cross recesses 16' and 17' on a second axis at a right angular or cross relationship to the recesses 14', 15' of the first axis. The front half section 12 has oppositely extending front semi-cylindrical cross recesses identical to the rear recesses 14' – 17' of the rear half section as shown, for example, by the front recess 14 in FIG. 1 and recess 17 in FIG. 3. The front and rear sections 12 and 13 are adapted to be releasably secured together preferably by a plurality of machine bolts 18 directed through front peripheral plate 19 of section 12 and into threaded engagement with peripheral rear section plate 20. The sections 12 and 13 are adapted to be placed in face-to-face relationship along a common plane defined by the mating surfaces 21 and 22 of the front and rear sections to form oppositely extending four composite cross bores which intersect in the common plane of the mating surfaces. Each of the circular cross bores terminate in a diametrically enlarged bore or counterbore 23 connecting with the aforementioned bores at a flange or shoulder 24. A valve plate 26 is positioned against the flange 24 and is retained by a snap ring 28 received in a groove 30 in the enlarged bore 23. An annular discharge reed plate 32 controls flow through a series of circumferentially spaced discharge apertures 34 and is retained by a plate 36. the valve plate assembly 37 or discharge valve means being secured together by a rivet 38 in a central aperture 40 in the valve plate 26. The reed plate 32 controls flow of pressurized gas into a discharge chamber 42.

The cylinder half sections 12 and 13 are circular in form and when secured along their mating surfaces 21 and 22 by suitable means such as bolts 18 are enclosed on their outer periphery by a cylindrical band 44 enclosing the discharge chamber 42, the band 44 being retained by means of a plurality of pins 43 in the rear section 12 after the cylindrical band 44 has been telescoped over the housing sections and seated against radial abutment means preferably in the form of a plurality of radially extending mounting flange ears 45 integrally formed on the front section, as seen in FIG. 1. Annu.ar seals 44a are received in front and rear housing grooves 44b, thereby providing a fluid type seal for discharge chamber 42.

The compressor is driven from the front end of a shaft 46 which includes spaced enlarged front bearing portion 48 supported for rotation through hub 49' integral with outwardly projecting cut-shaped front head 49 of front section 12 by main bearing assemblies 50 in communication forming one-half of a central suction space or inlet chamber 100 via lubricant bleed passageways 39. The shaft also includes an eccentric portion 52 having a slider block 54 mounted thereon for relative rotation between the shaft and the block via a plurality of separate elongated needle bearings 56 which are retained against axial movement relative to the eccentric portion 52 by needle retainers 41. As described in applicant's above-mentioned patent application the slider block 54 includes surfaces which engage surfaces of yoke portions 66 and 68, partially shown in FIG. 1, each of which is integral with an opposed double-acting or double-ended piston assembly to be described. The shaft 46 also supports a pair of counterweights 47, 47' and engages a shaft seal assembly (not shown) located in the space 51, the details of which are shown in applicants' mentioned patent application.

The cylindrical rear section 13 includes an outwardly projecting cup-shaped rear head 60 having an inwardly opening closed hub 61 which receives the previously described rear shaft portion 48' and its associated bearing assembly 50'. The counter-weights 47 are pivotably mounted to shaft eccentric 52 by a rivet 47a extending through an aperture 47b in the eccentric. The counter-weights contain tapered counterbores 47c which accommodate flared ends 47d of the rivets. A thrust washer 67 is provided between the annular closed hub 61 and surface 47e of its assoicated rear counterweight 47'. A front thrust bearing washer indicated at 69 is positioned between end surface 71 of the through annular hub 49' and surface 47e of its associated front counterweight 47. Reference may be had to the co-pending application Ser. No. 416,933 for details of one form of front bearing assembly.

Each of the yokes 66 and 68 are integral with a pair of 180° opposed or double-ended identical piston assemblies only one end of the piston assembly integral with yoke 66 being shown at 74. Each end of the piston assembly 74 is identical, only one end being shown in FIG. 1. The end shown comprises a diametrically enlarged central portion 80 which terminates in an integral cup portion 82 having a relatively short skirt portion 84 providing an outer surface 86. The outer surface 86 of the piston assembly 74 contains a relatively wide groove 90 receiving, in the preferred embodiment, a matched Teflon sealing ring 92 providing a fluid-tight seal between outer surface 86 of the piston and composite cylinder bore or wall 88 formed by the registering recesses.

A description of the operation of a similar double-acting piston may also be found in U.S. Pat. No. 3,784,331 issued Jan. 8, 1974, to John H. Heidorn and assigned to the same assignee as the present application, the disclosure of which is incorporated by reference herein. Reference should be had to the inventors' above-mentioned patent application for details of the piston ring assembly together with the circumferentially spaced inlet apertures 94 which are normally closed by a suction reed plate 96 or suction valve means which is operative to regulate flow of gas into the compression chamber 98 from an outlet chamber 100.

The integral formation between the two 180° opposed double-acting pistons of piston assembly 74 and the center yoke 66 is made possible in the instant form of applicants' invention because of the split housing 10 separated along a common transverse plane diametrical to the four composite aligned cross bores 88 whereby they are joined along their principal longitudinal axes which lie in the common diametrical plane defined by the parting or mating surfaces 21 and 22 of the front and rear half sections. The structure results in an improved method of assembling a radial compressor without the necessity of screws or other securing means being used to affix piston extensions to separate yoke components as shown, for example, in the above U.S. Pat. No. 3,784,331. The applicants' above-mentioned patent application Ser. No. 416,933 discloses one method of assembling a radial compressor without employing integral double-ended piston assemblies including the yokes by inserting a unitized drive shaft assembly through an open end of a radially bored one-piece casting into a journalled end of the casting and then press-fitting a pair of piston assemblies to normally disposed yokes on the assembly through cylinder bores 90° apart in the casting so that the pistons extend oppositely from each other from the yokes.

It has been found that by virtue of applicants' instant split housing design that the two piston assemblies when assembled on the shaft slider block 54 also serve as aligning means for assembling the two half sections 12 and 13 into the cylindrical housing 10. With the rear half section supported on a fixture with its mating surface 22 horizontally disposed and the piston skirt portions 84 being located in the cross recesses of the rear half section the front half section will be located without the need for plug inserts. This is possible because the Teflon sealing rings 92 are of a thickness relative to the depth of grooves 90 that they protrude from the surface of the pistons to insure bearing contact with the composite cylinder bore 88. This is done to prevent contact between the aluminum piston skirt 84 and the aluminum cylinder thereby obviating galling or metal to metal moving contact between the aluminum surfaces as explained in the above patent application Ser. No. 416,933. The wide Teflon rings 92 are sufficient to align and precisely locate the front and rear cross recesses prior to the half sections 12 and 13 being secured by the eight bolts 18 will compensate for any permissible tolerance differences between the cross bores.

In accordance with the novel features of this invention the radial four cylinder compressor may be assembled as follows:

1. The rear half section 13 is supported on a fixture with its mating surface 22 horizontally disposed so as to be facing up and with its closed head portion 60 down.

2. The rear thrust washer 67 is placed on the shaft rear bearing portion 48' and the shaft assembly plus the two piston assemblies thereon with shaft bearing portion 48' down, is then assembled on item No. 1 so that all four Teflon seal portions 92 of the pistons are received in their appropriate semi-cylindrical cross recesses 14'–17'.

3. The front thrust washer 69 is placed on the shaft front bearing portion 48.

4. The front half section 12 with its needle bearing 50 installed and with its open end down is now placed on the rear half section with its semi-cylindrical recesses 14–17 being properly aligned by receiving the upper portion of said piston Teflon, and the machine bolts 18 secured to form the housing 12.

5. The valve plate assemblies 37 are put into position and retained by snap rings 28.

6. The housing now is removed from the fixture and receive the two shell sealing O-rings 44a and assembled into grooves 44b and the shell 44 pushed to abut flange ears 45 and retained by pin 43.

It will be noted that concentric grooves 102 are formed about the machine bolt holes 104 in the rear section surface 22 for the reception of resilient O-rings 106 to seal the holes 104. The O-rings 106 are inserted in the grooves 102 when the rear half section 13 is supported horizontally during item No. 1 of the above assembly procedure.

While the embodiment of the present invention as herein disclosed constitutes a preferred form, it is to be understood that other forms might be adopted.

We claim:

1. A radial compressor of the type including a cast aluminum two part cylinder housing having cross bores including cylinder walls therein along axes normal to each other, said housing being substantially bi-laterally symmetrical along a common transverse plane diametrical to said cross bores, said housing constituted by two separable front and rear shell-like half sections secured together along said transverse plane; said transverse plane defining semi-cylindrical cross recesses in each said front and rear half section respectively, cooperating when registered to define said cross bores, said rear half section including an outwardly projecting rear cylindrical closed head having an inwardly opening concentric hub, a drive shaft having one end rotatably mounted in said hub, an eccentric on said drive shaft, a slider block rotatably mounted on said eccentric, a pair of yokes disposed normal to each other and in engagement with normal surfaces of said slider block, a pair of piston assemblies each including one of said yokes integral with a double-ended piston, each said double-ended piston arranged to extend oppositely from their interjacent yoke, said double-ended pistons each including a relatively short piston skirt; said piston skirts having an annular groove therein extending a major portion of the width along the skirt; a single Teflon sealing ring disposed in each piston skirt groove substantially the full width thereof to provide a relatively wide bearing surface between the piston skirts and the cylinder walls of said cross bores, the relatively wide bearing surface of said Teflon sealing ring being sufficiently wide to accomplish a fluid tight seal while compensating for any tolerance mismatch between the mating semi-cylindrical cross recesses of said front and rear housing half-sections.

2. An improved method of assembling a radial compressor of the type including a cast aluminum two part cylinder housing having counterbored cross bores including cylinder walls therein along axes normal to each other, said housing being substantially bi-laterally symmetrical along a common transverse plane diametrical to said cross bores, said housing constituted by two separable front and rear shell-like half sections secured together along said transverse plane, said transverse plane defining semi-cylindrical cross recesses in each said front and rear half section respectively comprising the steps of supporting said rear half section horizontally with its concentric closed head portion down, inserting the rear end bearing portion of a unitized drive shaft assembly and its assoicated journal bearings into a cup-shaped hub on the inner face of said rear head, said drive shaft assembly including a pair of piston assemblies, each said piston assembly including a yoke having a pair of diametrically opposed integral pistons extending therefrom, each piston formed with relatively short skirt having an annular groove therein extending a major portion of the width along the skirt, a single Teflon sealing ring disposed in each groove to provide a relatively wide bearing surface between the skirts and their associated cross recess such that each Teflon seal portion is supported in contact with its respective rear half section cross recess, placing said front half section on said rear half section with said front concentric apertured head portion facing up whereby said drive shaft assembly front end extends through said aperture, said front half section having its four semi-cylindrical cross recesses supported in contact with the upper half of the four Teflon seals whereby the cross recesses of said upper and lower half sections are precisely aligned to form said cross bores, securing the front and rear aligned half sections by connecting bolts, placing a valve plate assembly in sealed relationship in each said counterbore radially outboard of each piston, respectively, and pressing a sleeve into surrounding relationship with said cylinder housing outboard of said plate valve assemblies to form a discharge chamber around said cylinder housing.

3. A radial compressor according to claim 1 wherein each Teflon sealing ring is rectangular sectioned.

* * * * *